US010180367B2

(12) United States Patent
Khosla et al.

(10) Patent No.: US 10,180,367 B2
(45) Date of Patent: Jan. 15, 2019

(54) METHOD OF DETERMINING OPTIMAL OPERATION CONDITIONS FOR TREATING HOLES WITH ROTARY TOOLS

(71) Applicants: Vishal Khosla, San Jose, CA (US); Nick Doe, San Jose, CA (US); Jun Xiao, San Jose, CA (US); Ming Chan, San Jose, CA (US); Gautam Char, San Jose, CA (US)

(72) Inventors: Vishal Khosla, San Jose, CA (US); Nick Doe, San Jose, CA (US); Jun Xiao, San Jose, CA (US); Ming Chan, San Jose, CA (US); Gautam Char, San Jose, CA (US)

( * ) Notice: Subject to any disclaimer, the term of this patent is extended or adjusted under 35 U.S.C. 154(b) by 214 days.

(21) Appl. No.: 15/390,484

(22) Filed: Dec. 24, 2016

(65) Prior Publication Data

US 2018/0178341 A1 Jun. 28, 2018

(51) Int. Cl.
*G01L 3/14* (2006.01)
*B23Q 17/09* (2006.01)

(52) U.S. Cl.
CPC ........ *G01L 3/1457* (2013.01); *B23Q 17/0966* (2013.01)

(58) Field of Classification Search
CPC ................. B23Q 17/0966; G01L 3/1457
USPC .... 702/42, 43; 73/862.041–862.044, 862.49, 73/862.381, 862.451, 862.471–862.474
See application file for complete search history.

(56) References Cited

U.S. PATENT DOCUMENTS

| 2,791,304 | A | | 5/1957 | Better et al. |
| 4,133,206 | A | * | 1/1979 | Hida ........................ B23Q 5/26 |
| | | | | 73/862.49 |
| 4,583,411 | A | | 4/1986 | Hales |
| 4,649,757 | A | | 3/1987 | Crespin |
| 7,647,808 | B2 | * | 1/2010 | Junkers ................. G01L 25/003 |
| | | | | 73/1.08 |
| 8,556,000 | B2 | | 10/2013 | Dosmette et al. |
| 9,410,863 | B2 | * | 8/2016 | Nichols ................. G01L 25/003 |
| 2003/0056605 | A1 | * | 3/2003 | Chiapuzzi ............. G01L 25/003 |
| | | | | 73/862.21 |

FOREIGN PATENT DOCUMENTS

CN 1394712 3/2003

* cited by examiner

*Primary Examiner* — Jonathan Dunlap

(57) ABSTRACT

Proposed is a method of determining optimal operation conditions for treating holes with a rotary tool by performing a hole treatment operation on a tester under various treatment conditions which are similar to the use of the tool in the industrial production on a real manufacturing equipment. The method consists of changing the treatment conditions and determining those operation parameters at which the treated hole is most optimally satisfies the given technical requirements. A criterion for evaluation of these optimal conditions is equality of pair forces acting on the rotary tool in the X- and Y-axis directions since such a situation prevents sidewise deviation of the tool from the direction of the thrust force applied in the Z-axis direction. The above condition is provided by the specific structure of the tester used for carrying out the method.

15 Claims, 7 Drawing Sheets

Fig. 5A
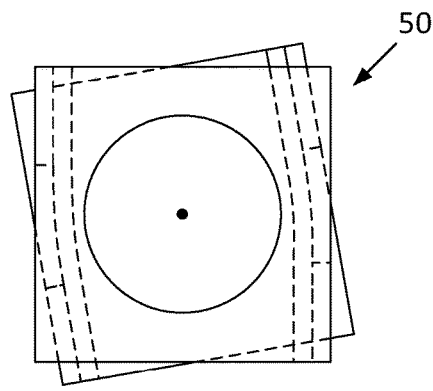
Fig. 5B
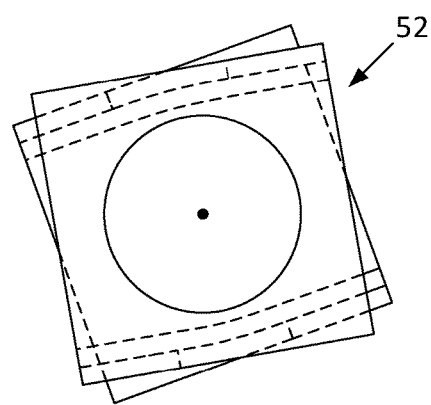
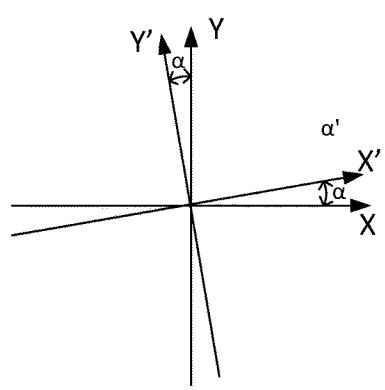
Fig. 6A
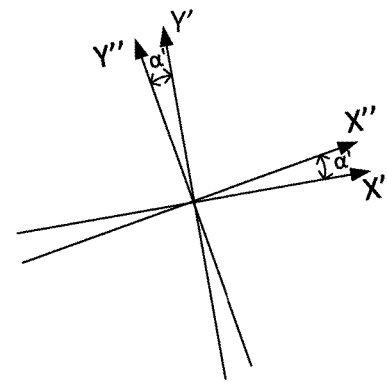
Fig. 6B

METHOD OF DETERMINING OPTIMAL OPERATION CONDITIONS FOR TREATING HOLES WITH ROTARY TOOLS

BACKGROUND OF THE INVENTION

Field of the Invention

The invention relates to a method of determining optimal operation conditions for treating holes with rotary tools. In particular, the invention relates to a method of determining optimal operation conditions for treating holes with rotary tools on such operations as drilling, tapping, countersinking, or the like. The optimal conditions are found by performing hole treating operations on a special tester under the same operations conditions which are to be subsequently used in actual manufacturing production processes on real manufacturing equipment, e.g., in mass production.

Description of the Related Art

It is known that during such operations as drilling, tapping, countersinking, reaming, or the like the optimal work of a rotary tool depends on many factors such as a thrust force, geometry of the tool, drive torque, friction conditions on the treated surface, amount of feed, etc.

Some devices known heretofore for testing rotary tools on hole treating operations are based on measuring a torque developed during the operation.

For example, U.S. Pat. No. 4,583,411 describes a method and apparatus for dynamically testing a rotational torque producing device during calibration under conditions simulating actual operating conditions. The torque produced by the torque producing device under controlled load conditions similar to actual operating conditions is converted by a transducer to an electrical signal and monitored to assure that the stall torque of a torque producing device is within an acceptable band.

U.S. Pat. No. 2,791,304 describes a method based on stopping the turning action on the tool, such as a tapping tool, when the strain reaches a predetermined or excessive amount and fully releasing the torque or twist on the tap until the tap is withdrawn. The method prevents breakage of the taps under various or unusual conditions by using protective means.

Chinese Patent Application Publication No. 1,394,712 describes a method for on-line fault diagnosis of vibration threading and its equipment. The apparatus includes vibration threading machine unit, drive and control unit of stepper motor and torque measuring unit, a torque sensor and a threading torque analysis and storage system which are series-connected between its main shaft input end and threading grip holder. The torque sensor is fixedly connected with main shaft of threading machine by means of elastic holding mechanism formed from elastic holder base cover, locking cover and locking screw.

U.S. Pat. No. 8,556,000 discloses a method and a device for monitoring a drilling or coring operation and installation comprising such a device. The device comprises equipment for measuring parameters of a drilling or coring operation by means of a drill bit fixed to the end of a drill string, measurement equipment being housed in a chamber (5) made in a coupling (1, 18) that is designed to be interposed between two drill string pipes or between the drill bit and a drill string pipe, or to constitute an adapter (18) for a cutting head (15) of the drill bit of a drill string.

U.S. Pat. No. 4,649,757 discloses a method and a device for calibrating a machine tool including a tool rotating about its axis XX', comprising a tubular-shaped support with an annular fixing component connecting it to the housing of the machine tool so that its central opening forms an extension of the opening of the housing for the passage of the tool. The support also has at least one part which is deformable under the action of twisting about the axis XX' and is provided with at least one strain gauge and an end part which is opposite the fixing component and in which there is arranged, along the axis of the support, a component for connecting the end of the tool, which component is provided with means enabling locking of said tool in rotation with the connection component. The latter carries a disk located between two annular components held against the disk by adjustable means. As a result of a measuring means associated with the strain gauge, a current representing the resisting torque opposing the tool may be measured via the disk and other components. The invention relates, in particular, to machines for screwing the partitioning of a nuclear reactor core.

SUMMARY OF THE INVENTION

The invention relates to a method of determining optimal operation conditions for treating holes with rotary tools. In particular, the invention relates to a method of determining operation conditions most optimal for treating holes with rotary tools on such operations as drilling, tapping, countersinking, or the like.

It is known that during such operations as drilling, tapping, countersinking, reaming, or the like the optimal work of a rotary tool depends on many factors such as a thrust force, geometry of the tool, drive torque, friction conditions on the treated surface, amount of feed, etc.

In view of the above, the method of the invention consists of: providing given technical specification requirements for a hole to be treated under real production conditions by a rotary tool having an axial direction; providing a tester that allows to independently measure a force applied during the hole treatment operation to the rotary tool in the axial direction of the tool and forces acting on the rotary tool in two mutually perpendicular directions, which are also perpendicular to the axial direction of the rotary tool; initiating a hole treatment operation on the tester under a test conditions which allow to simulate the real production conditions and applying to the rotary tool a force acting in the axial direction; independently measuring the force acting in the axial direction and the forces acting on the rotary tool in two mutually perpendicular directions; determining the test conditions that provide equality of the aforementioned forces acting in two mutually perpendicular directions; repeating the test conditions n-times; and selecting the test conditions most optimal for the hole treatment operation under said given technical requirements.

The given technical requirements may be represented, e.g., by tolerances on coaxiality of the treated hole, surface roughness on the inner surface of the hole, deviations from the ideal roundness of the hole, or the like. The test conditions may be exemplified by a magnitude of the thrust force applied to the rotary tool in the direction of Z axis which coincides with the aforementioned axial direction, the amount of axial feed applied to the tool, geometry of the tool cutting edges, etc.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique.

FIG. 5A is a top view illustrating the angular deviation of the first force measurement unit under effect of a pair of forces acting in the direction perpendicular to the X-axis.

FIG. 5B is a top view illustrating the angular deviation of the first force measurement unit under effect of a pair of forces acting in the direction perpendicular to the Y-axis.

FIG. 6A is a diagram illustrating directions of forces that cause deformations shown in FIG. 5A.

FIG. 6B is a diagram illustrating directions of forces that cause deformations shown in FIG. 5B.

DETAILED DESCRIPTION

Figure 1A:
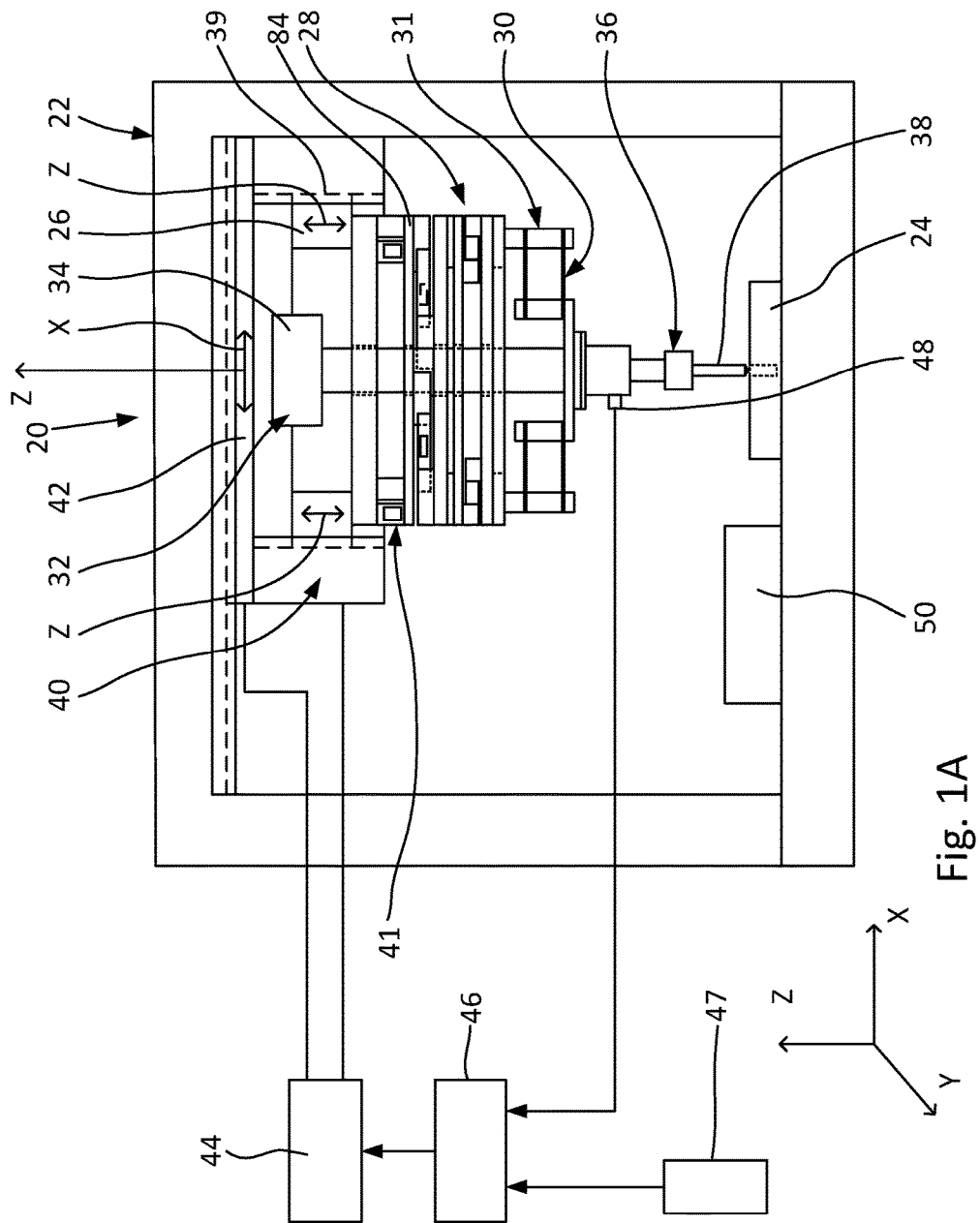
FIG. 1A is a general side view of the torque measurement tester of the invention for testing a hole treating rotary tool.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

The invention relates to a method of determining optimal operation conditions for treating holes with rotary tools. In particular, the invention relates to a method of determining operation conditions most optimal for treating holes with rotary tools on such operations as drilling, tapping, countersinking, or the like.

It is known that during such operations as drilling, tapping, countersinking, reaming, or the like the optimal work of a rotary tool depends on many factors such as a thrust force, geometry of the tool, drive torque, friction conditions on the treated surface, amount of feed, etc.

In view of the above, the method of the invention consists of: providing given technical requirements for a hole to be treated under real production conditions by a rotary tool having an axial direction; providing a tester that allows to independently measure a force applied to the rotary tool during the hole treatment operation in the axial direction and forces acting on the rotary tool in two mutually perpendicular directions, which are also perpendicular to the axial direction of the rotary tool; initiating the hole treatment operation on the tester under test conditions, which allow to simulate the real production conditions, and applying to the rotary tool a force acting in the axial direction; independently measuring the force acting in the axial direction and the forces acting in the directions perpendicular to the axial direction; determining test conditions that provide equality of the forces acting in the directions perpendicular to the axial direction of the rotary tool by varying test conditions and calculating a torque applied to the rotary tool under the balanced conditions of forces acting in the directions perpendicular to the axial direction of the rotary tool; repeating the test conditions n-times; and selecting the test conditions most optimal for the hole treatment operation by reproducing the obtained torque during treatment of the hole under real production conditions thus satisfying the given technical requirements.

The given technical requirements may be represented, e.g., by tolerances on coaxiality of the treated hole, surface roughness on inner surface of the hole, deviation from the ideal roundness of the hole, or the like. The test conditions may be exemplified by a value of the thrust force applied to the rotary tool in the direction of Z axis which coincides with the aforementioned axial direction, the amount of axial feed applied to the tool, geometry of the tool cutting edges, etc.

In order to understand the principle of the method of the present invention, let us first consider an example of a tester suitable for carrying out the method.

FIG. 1A is a general side view of the torque measurement tester, which in its entity is designated by reference numeral 20. The tester 20 contains a rigid frame 22 that supports a sample support unit 24 at the lower side, a thrust developing unit 26 at the upper side, and a torque measurement unit 28 having a rotary head 32 which holds a rotary tool 38 that is resiliently attached to the resilient tool holder 31 via a springing device 30. The rotary head and, hence, the rotary tool, have a longitudinal axis O-O (FIG. 1 B), which in this case coincides with axis of the tool rotation.

The rotary head 32 has a rotary drive motor 34 and a tool holder 36 that is intended for securing the rotary tool 38, e.g., a tapping tool, which is to be tested.

The thrust developing unit 26, which applies a force to the torque measurement unit, and hence to the rotary tool 38, can move in the direction of the arrows Z and is guided in this direction in the guides 39 of a carriage 40. The carriage 40, in turn, can be driven in the direction of arrow X perpendicular to the Z-direction along guides 42 installed on the frame 22.

Reference numeral 44 designates a schematically shown combined driver unit for controlling drives in the, X, Y, and Z directions, where Y-axis is perpendicular to the plane of the drawing in side view of FIG. 1A. Reference 46 designates a CPU which collects all data obtained from the sensors (described below) and controls the operation of the tester through the computer 47. The reference numeral 48 designates an acoustic sensor, and 49 designates a tool cleaning station. The devices 44, 46,47, 48, and 49 are subjects of other patent applications and are beyond the scope of the present invention.

Having described the torque measurement tester 20 in general, let us consider the main components of the tester 20 in detail separately.

Figure 1B:
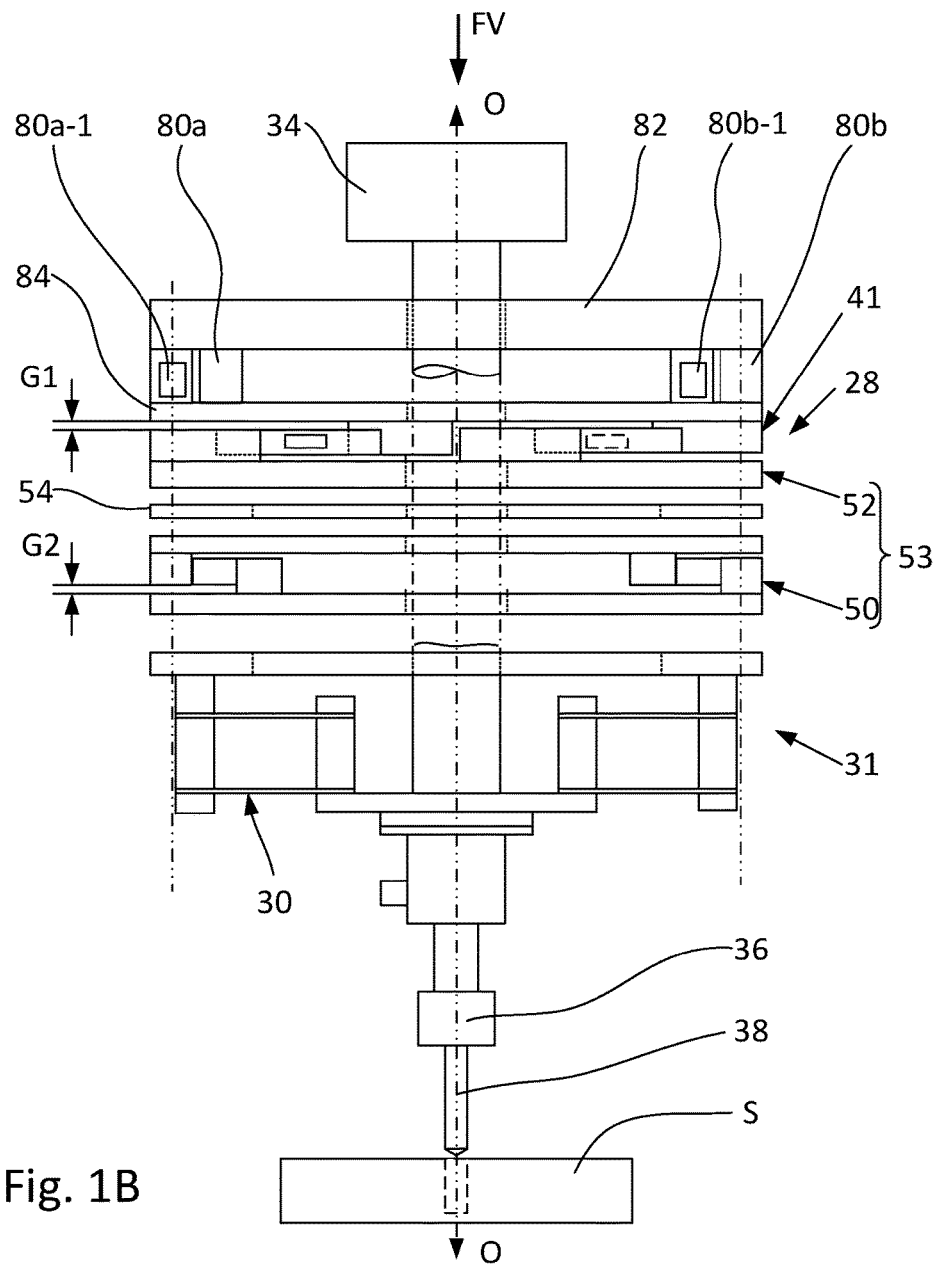
FIG. 1B is an exploded side view of the torque measurement unit of the tester of FIG. 1A.

The structure of the torque measurement unit 28 is shown in more detail in FIG. 1B, which is an exploded side view of the torque measurement unit 28 of the tester of FIG. 1A.

In FIG. 1B, reference numeral 41 designates a thrust force measurement unit which contains pressure sensitive members 80a and 80b that are deformed under the effect of a compression force and that support respective pressure sensors 80a-1, 80b-1. There may be two other similar sensors which cannot be seen in the drawing. The pressure sensors 80a-1, 80b-1 are force sensors, e.g., of a strain-gauge type. The pressure sensitive members, which are deformed under the effect of a compression force of the thrust developing unit 26 are sandwiched between an upper thrust unit plate 82, which is rigidly connected to the thrust developing unit 26, and a lower thrust unit plate 84, which is rigidly connected to a third force measurement sensor unit 52, which is described below.

More specifically, in addition to the thrust force measurement unit 41, the sensor 20 of the invention is provided with a sensor unit package 53 (FIG. 1B) composed of a second sensor unit 50 with second sensors and a third sensor unit 52, which is similar to the sensor unit 50 but is turned by 90° relative to the second sensor unit 50 around the axial direction of the rotary tool, i.e. around the axis of the tool rotation. The sensor units 50 and 52 are interconnected through a gasket 54.

Figure 2:
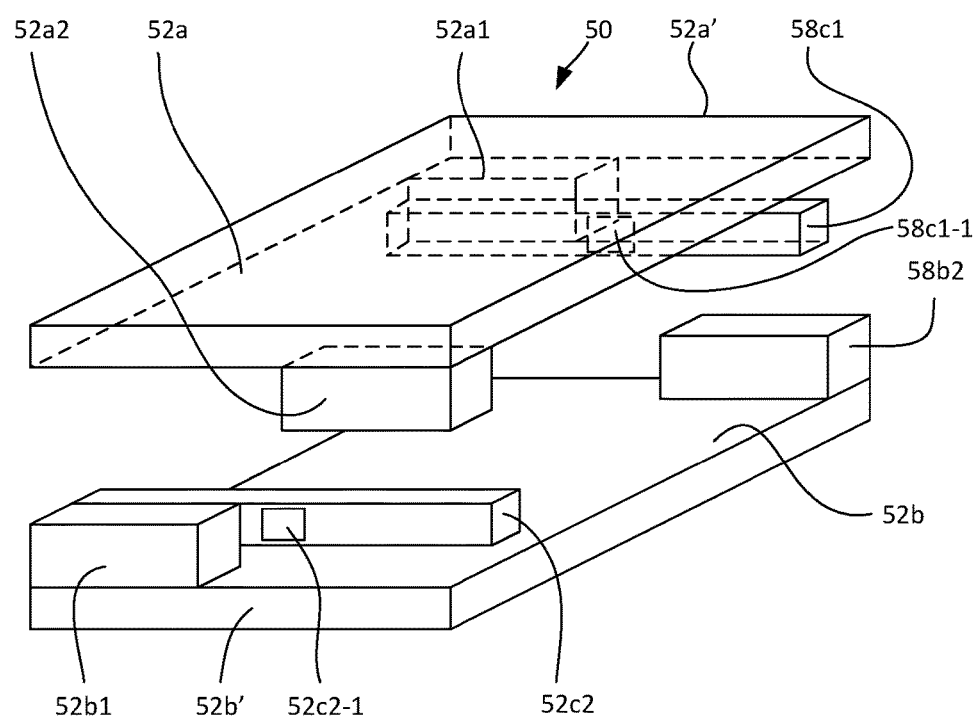
FIG. 2 is an exploded perspective view of a force measurement unit used in the torque measurement unit of the tester of FIG. 1A.

Since the second and third sensor units are identical, let us consider in detail only one of them, e.g., the third sensor unit 52, which is shown in FIG. 2 in the form of an exploded view.

As can be seen from FIG. 2, each sensor unit 50 or 52 consists of an upper sensor-holding plate 52a and a lower sensor-holding plate 52b. Each sensor-holding plate has rigid blocks at two diametrically opposite corners firmly attached to the respective sensor-holding plates. Thus, the upper sensor-holding plate 52a has a rigid block 52a1 (shown by broken lines in FIG. 2) and a diametrically opposite rigid block 52a2. On the other hand, the lower sensor-holding plate 52b has a rigid block 52b1 and a diametrically opposite rigid block 52b2. Attached to the inward facing surface of the block 52a1 is a flexible beam 58c1 that in the illustrated embodiment extends parallel to the side 52a' of the plate 52a, i.e., to the axis X (see FIG. 1). Similarly, attached to the inward facing surface of the block 52b1 is a flexible beam 52c2 that in the illustrated embodiment extends parallel to the side 52b' of the plate 52b, i.e., to the axis Y (see FIG. 1A).

In an assembled state of the force sensor measurement unit 50 shown in FIG. 2, the flexible beam 52c1 is spaced from the surface of the upper sensor-holding plate 52a with the gap G1 (FIG. 1B), and flexible beam 52c2 is spaced from the surface of the lower sensor-holding plate 52a with the gap G2, which is equal to the gap G1. In fact, both flexible beams are spaced from both upper and lower plates so that the plates and beam together form a flexible parallelogram with the upper plate 58a and the lower plate 58b flexibly moveable coplanar to each other when the flexible beams 58c1 and 58c2 are resiliently deformed.

In other words, the rigid blocks 52a1, 52a2, 52b1, and 52b2 function as spacers that space the upper sensor-holding plate 58a and the lower sensor-holding plate 58b parallel to each other and at a certain distance from each other, while the flexible beams 58c1 and 58c2 function like resilient members that allow the plates to shift coplanar to each other in the horizontal direction under the effect of a friction force Ff acting, e.g., in the direction perpendicular to the X-axis direction (see FIGS. 3A and 3B), that may occur between the outer side surface of the hole treating tool 38 and the inner wall 60 of the hole 62 treated by the tool 38 in a sample S (FIG. 3A) installed in the sample holder 24 (FIG. 1).

Thus, each of the sensor blocks 50 and 52 is made in the form of a package of two identical flexible parallelograms, which are turned by 90° to each other around the axial direction, i.e. the axis of the tool rotation, wherein each parallelogram consists of an upper sensor-holding plate, such as the plate 52a, and a lower-sensor holding plate, such as the plate 52b, where both plates are interconnected via flexible beams 52c1 and 52c2. The flexible beams allow coplanar movements of the upper sensor-holding plate 52a and the lower-sensor holding plate 52b relative to each other. Since the parallelograms are turned by 90° to each other, the beams allow independent flexible movements of the respective plates in the X-axis and Y-axis directions.

In other words, the package 53 does not limit independent movements of the at least two second sensors of the sensor unit 50 and the at least two third sensors of the sensor unit 52. It is also seen from FIG. 4 that the resilient tool holder 31 is resiliently connected to the second sensor unit 50 via the springing device 30.

Figure 3A:
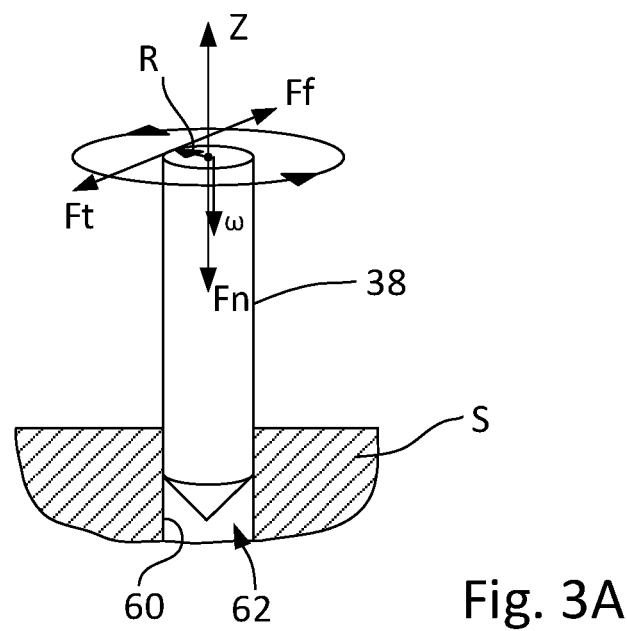
FIG. 3A is a scheme illustrating forces acting on a rotary tool in the tester of the invention.

FIG. 3A is a scheme illustrating forces acting on a rotary tool in the tester of the invention. A local change of the friction force Ff may be caused by such factors as wear of the tool cutting edges, contamination of the treated hole 62 with cutting debris, lack of proper lubrication, etc. In FIG. 3A, R designates a tool radius, Fn is a vertical thrust force, ω is an angular rotation speed developed by the rotary drive motor 34 (FIG. 1), and Ft is a cutting force applied to the treated material from the cutting edges of the tool 38. It is assumed that in a first approximation the friction force Ff is a reaction to the force Ft. In FIG. 3A the arrowed circle shows direction of rotation of the rotary tool 38.

If during a hole treating operation such as tapping, drilling, countersinking, etc., the angular rotation speed ω remains constant, the aforementioned forces Ff and Ft are in balance. However, any local changes in the force Ft caused by the aforementioned factors will cause changes in the force Ff. The cutting force torque Tc developed during cutting on the rotary cutting tool 38 is defined as a vector product of the cutting force, i.e., the product of Ft force on the tool radius R. Similarly, the product of the Ff on the tool radius R is defined as a resistance torque Tr. As a result, the change in the forces or imbalance in the values of the torques Tc and Tr leads to changes in the treatment conditions. It is understood that normal cutting conditions will be provided when the torques Tc and Tr are in balance, and measurement under such torque balance conditions will allow to determine such process parameters as speed of rotation, thrust force, tool feed, tool geometry, lubricant etc., which will provide reliable hole treatment operation when the treatment conditions selected on the tester 20 will be observed on the real production equipment.

Figure 3B:
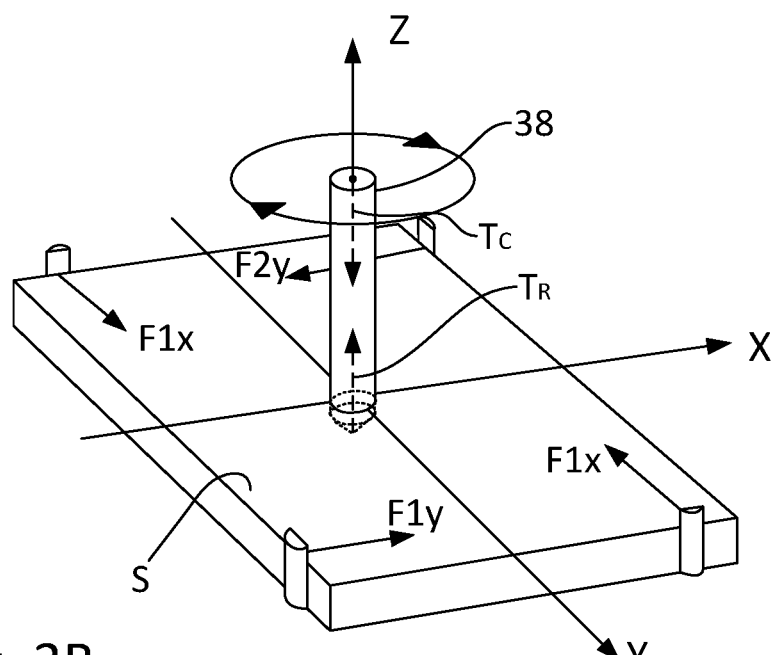
FIG. 3B is another view illustrating forces acting on a rotary tool in the tester of the invention.

FIG. 3B is another view illustrating forces acting on a rotary tool in the tester of the invention. This drawing illustrates, e.g., a tapping operation where the tool 38 is a tapping tool that cuts a thread in the hole of the material sample S secured in the sample holder 24. This drawing shows two pairs of forces F1x-F2x acting in the directions perpendicular to the X-axis and F1y-F2y acting in the directions perpendicular to the Y-axis. As mentioned above, the treatment conditions at which the pairs of forces F1x-F2x and F1y-F2y are in balance are the goal of the tests conducted on the tester 20.

Figure 4:
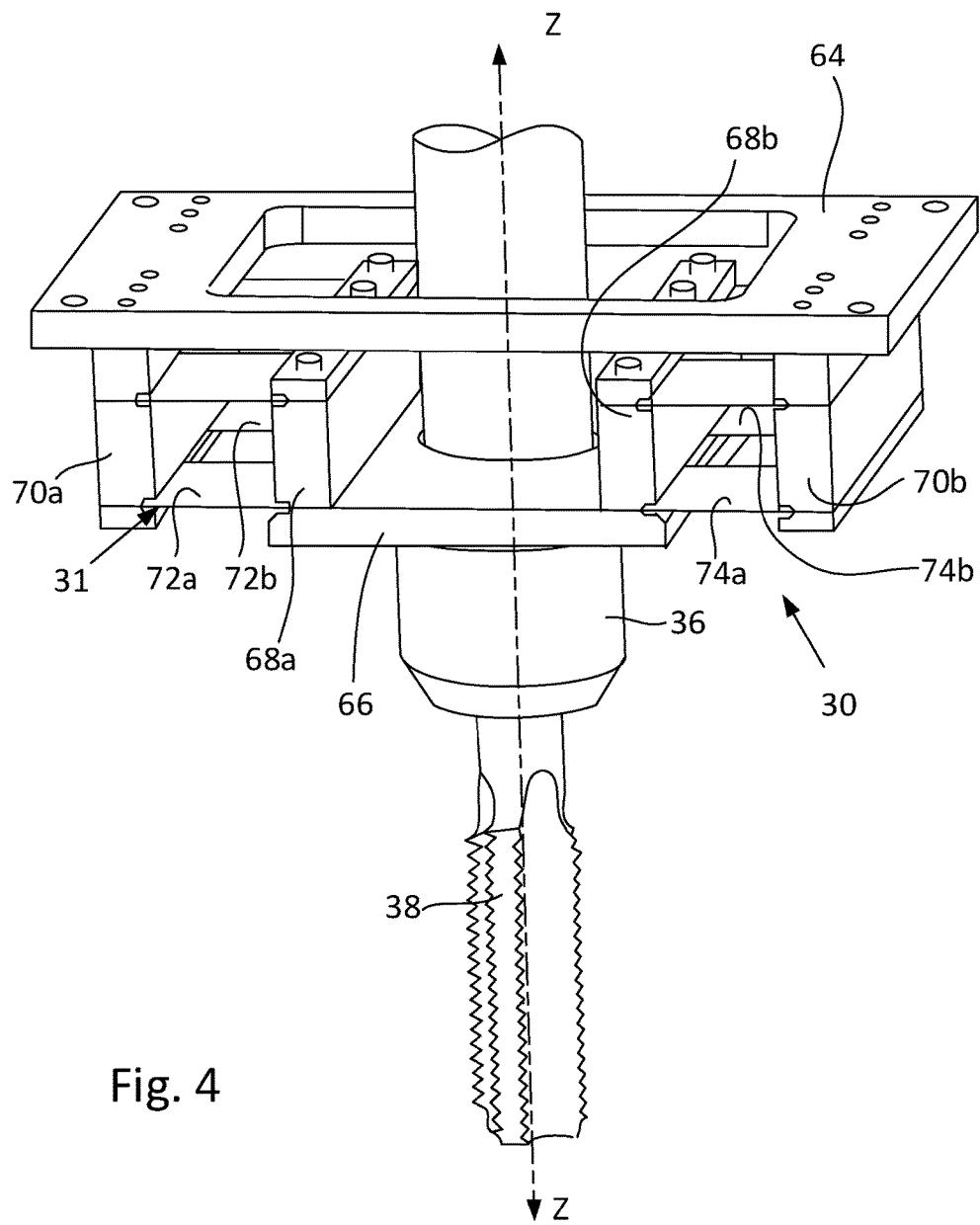
FIG. 4 is a perspective view of a resilient tool holder used in the torque measurement unit of the tester of the invention.

FIG. 4 is a three-dimensional view of the resilient tool holder unit 31, which constitutes an important part of the torque measurement unit 28.

The resilient probe holder unit 31 consists of a probe-holder upper plate 64 and a probe-holder lower plate 66 having dimensions smaller than the probe-holder upper plate 64. The probe-holder upper plate 64 and the probe-holder lower plate 66 are spaced from each other in a vertical direction by inner spacers 68a and 68b.

Attached to the ends of the probe-holder upper plate 64 are outer spacers 70a and 70b that are located outward from the inner spacers 68a and 68b and hang downward from the probe-holder upper plate 64 so that they are horizontally aligned with the inner spacers 68a and 68b.

The inner and upper spacers 68a and 68b and 70a and 70b, respectively, are interconnected via the springing device 31 that consists of a set of leaf springs 72a, 72b, 74a, 74b, etc. (the springs located on the other sides of the plates are not seen in the drawings; in this embodiment, the total number of springs is eight). In such a construction, the probe-holder upper plate 64 is rigidly attached to the lower sensor-holding plate 52b of the second sensor unit 52 (FIG. 2), while the probe-holder lower plate 66 that rigidly holds the rotary tool 38 is resiliently attached relative to the probe-holder upper plate 64 and may perform resilient vertical movements in the direction of the Z-axis together with the rotary head tool 38 attached to this plate. In other words, the tool holder 36, and hence, the rotary head 32, are attached to the probe-holder lower plate 66 of the springing device 30 and is resiliently connected to the probe-holder upper plate 64 via the set of the leaf springs 72a, 72b, 74a, 74b, etc.

Thus, it is understood that in the torque measurement unit 28 of the tester 20 of the present invention the upper and lower plates 52a and 52b contained in the third force measurement sensor unit 52 have freedom of movements only in the Y-axis direction and are restrained from the movements in the X-axis direction. On the other hand, the upper and lower plates (not shown, as the structures of the units 50 and 52 are identical), contained in the second force measurement sensor unit 50 have freedom of movements only in the X-axis direction and are restrained from the movements in the Y-axis direction. As a result, it is obvious that each force sensor measurement unit that contains two force measurement sensors, preferably of strain-gauge type, such as the sensors 52c1-1 and 52c2-1 (FIG. 2), allows to measure the pair of forces which twists one of the force measurement sensor unit. Such a condition is shown in FIG. 5A, where the first force measurement sensor unit 50 is shown in a deformed and twisted position relative to the second force measurement sensor unit 52 under the effect of the pair of forces acting in the direction of the X-axis. Similarly, FIG. 5B shows the second force measurement sensor unit 52 in a deformed and twisted position relative to the first force measurement sensor unit 50 under the effect of the pair of forces acting in the direction of the Y-axis.

FIG. 6A is a diagram illustrating directions of forces that cause deformations shown in FIG. 5A.

FIG. 6B is a diagram illustrating directions of forces that cause deformations shown in FIG. 5B.

These diagrams show angular deformations of the force measurement sensor units in the X-Y plane. For better understanding the principle of deformations of the units the twist angles $\alpha$ and $\alpha'$, as well as the deformed shapes depicted by broken lines are shown in an exaggerated form. Since in reality the twist angles $\alpha$ and $\alpha'$ are extremely small, the angular deformations may be neglected. Thus it can be assumed that the torques are produced by pairs or forces measured in two mutually perpendicular directions.

Figures 7A, 7B:
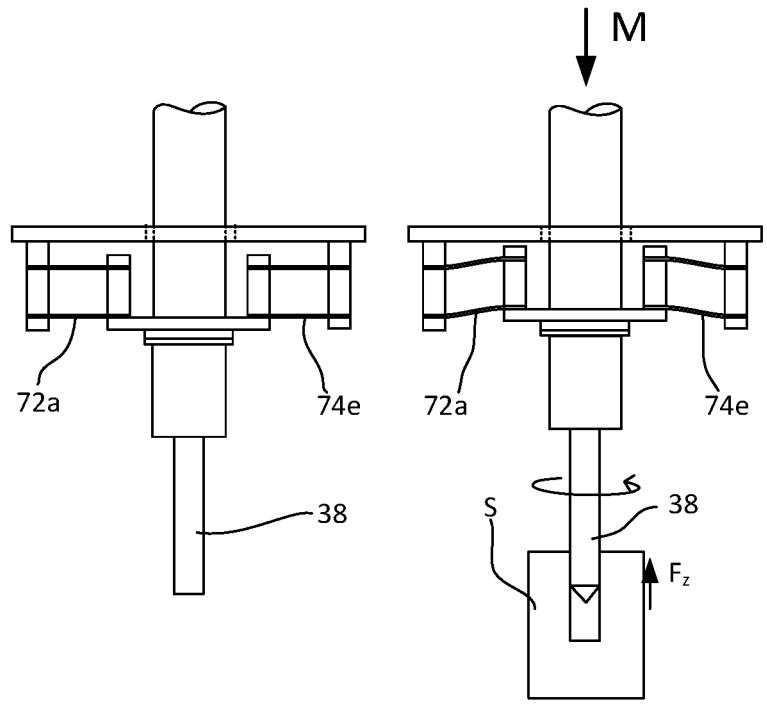
FIG. 7A is a side view of the resilient tool holder unit of FIG. 4 under no-load conditions.
FIG. 7B is a side view of the resilient tool holder unit of FIG. 4 illustrating deformations of the holder unit in the Z-axis direction under the effect of a vertical load applied to the tool from the test specimen.

FIG. 7A is a side view of the resilient tool holder unit of FIG. 4 under no-load conditions.

FIG. 7B is a side view of the resilient tool holder unit of FIG. 4 illustrating deformations of the holder unit in the Z-axis direction under the effect of a vertical load applied to the tool from the test specimen. It can be seen from FIG. 7B that when during a treatment operation the rotary tool 38 experiences resistance to the vertical thrust force Fv applied from the thrust developing unit 26, this causes deformation of the leaf springs such as the leaf springs 72a, 72b, 74a, and 74b which is shown in FIG. 7B. In this case, through the springing package 30 the force of the leaf springs 72a, 72b, 74a, and 74b is transmitted to the thrust force measurement unit 41 and, in fact, to the pressure sensors, such as sensors 80a-1, 80b-1 (FIG. 1B). The measurement of the thrust force F and, in fact, of the resistance to the feed of the rotary tool in the vertical direction toward the sample S is carried out independently from measurements of the torque. In other words, the measurement of the forces acting in the X-Y plane and in the Z-axis direction do not affect each other, i.e., can be performed without mutual cross-talks.

The pressure sensors can be represented by tension sensors, film piezo sensors, or the like and can be pasted to the deformable surfaces in a manner known in the art. The number and arrangement of the sensors may vary but for convenience of operation and calibration it is recommended that the sensors on the pressure sensitive members, such as the sensors 80a-1 and 80b-1, be arranged opposite to each other in the diagonal direction. In fact, there are four such sensors in opposite corners of the upper thrust unit plate 82 but only two of them are shown.

In operation, a rotary tool 38, which constitutes an object of the test, is tested on various specific operations for which it is intended to be used under real manufacturing conditions, e.g., in mass production on production equipment. The test operations are carried out by using different materials, instruments with different geometries, different lubricant, tool feeds, thrust forces, etc. The forces acting on the tool during the test, i.e., the vertical thrust force FV (FIG. 1A), and two mutually perpendicular horizontal forces, such as F1x, F2x and F1y, F2y (FIG. 3B), are measured simultaneously and independently from each other. Since the data obtained in the test will be then used in a real production process, it is extremely important to carry out the tests under conditions of high accuracy and reproducibility of the obtained results. This is achieved due to independence in measurement of forces acting on the tool from different directions.

If the rotary tool 38 operates under normally selected conditions and operation parameters, there will be no misbalance between the data obtained from the X and Y-axes sensors, such as sensors 52c1-1, 52c1-1, etc. When during the test of the rotary tool the torque is abnormally grows, e.g., because of the increased friction between the rotary tool and the inner walls of the hole being treated, to the extent that leads to distortion or deflection of the tool axis relative to the axis of the treated hole, this phenomenon will cause difference in signals obtained on X and Y-axes sensors. For example, such an effect may be observed if the direction of the vertical force FV applied to the tool has been deviated from the axis of tool rotation. A similar effect may occur in treating holes formed in composite material made from components having different densities, or the like.

The coaxiality can be measures, e.g., in accordance with the method disclosed in U.S. Pat. No. 5,379,112, which describes a process for relative measurement of the centerline of an aperture and the centerline of a cylindrical outline.

According to the invention, one of the criterion on which the method of the invention is based is achieving a compliance with the technical requirements based on the principle of equality of the forces measured by the second and third sensors. This is because such an equality testifies to the fact that pairs of forces $F1x$-$F2x$ acting in the directions perpendicular to the X-axis and $F1y$-$F2y$ acting in the directions perpendicular to the Y-axis (FIG. 3B) are equal and that this equality prevents deviation of the longitudinal axis O-O of the rotary tool from the Z-axis direction and thus prevents distortion of the hole being treated. Knowing the values of the balanced forces $F1x$-$F2x$ acting in the directions perpendicular to the X-axis and $F1y$-$F2y$ acting in the directions perpendicular to the Y-axis and knowing the value of the rotary tool radius, it is possible to calculate a torque developed on the rotary tool at such balanced condition of the forces and, thus to reproduce the torque determined under optimal conditions on the tester on the real production equipment during the hole treatment operation under industrial conditions.

A maximum surface roughness $R_{max}$ and a center line average roughness $R_a$ on the inner surface of the treated hole can be measured in accordance with definitions set by Japanese Industrial Standards (JIS) B0601 by using a simplified surface roughness meter of Tokyo Seimitsu Co., Ltd. (Model: Surfcom 300B).

Concentricity, ovality and deviation of the treated hole from the ideal circular form can be measures by using The LaserLinc UltraGauge+™ series of ultrasonic devices for measuring, among other parameters, concentricity and ovality of the holes. Measurement of inside diameters and outside diameters are performed by scanning laser micrometers.

Alternatively, the method of the invention may be presented as a method for determining operation conditions most optimal for performing a hole treating operation under industrial conditions, wherein the rotary tool has a longitudinal axis and wherein the method comprises the steps of: providing a tester that allows independent measurements of the first force applied during the treatment to the rotary tool in the longitudinal direction of the rotary tool and second and third forces acting on the rotary tool in two mutually perpendicular to each other and to the longitudinal axis; providing the tester with a three-layer torque measurement unit consisting of a first layer for measuring the first, second, and third forces acting in the axial direction and two other layers for measuring forces, which are also perpendicular to the direction of the tool; measuring the forces independently during the hole treating operation on the tester; determining the test conditions that provide equality of forces acting in the directions perpendicular to the direction of the rotary tool by selecting various test conditions; changing test conditions n-times; repeating the test at new test conditions; selecting the conditions most optimal for the hole treating operation; and reproducing the found conditions most optimal for the hole treating operation under real production conditions.

The independency of measurement of forces acting in the three directions is achieved by interconnecting all three sensor units resiliently so that measurement in the axial direction does not affect the measurement in the two directions perpendicular to the axial direction, while resilient connection between other two sensor units allows independent measurement of forces acting in mutually perpendicular direction. The first-mentioned resiliency is achieved by suspending the rotary tool to the lower sensor unit via springs elastically compressible in the axial direction of the tool. The second-mentioned resiliency between the sensor units that measure forces in the direction perpendicular to the axial direction is achieved by interconnecting the sensors of these units via flexible beams which are resilient in the directions perpendicular to the axial direction of the tools.

Although the invention has been described with reference to specific examples and shown in specific drawings, it is understood that these examples and drawings cannot be construed as limiting the application of the invention and that any changes and modifications are possible without deviation from the scope of the attached claims.

What is claimed is:

1. A method of determining optimal operation conditions for treating holes with rotary tools, comprising the steps of:
providing given technical requirements for a hole to be treated by a rotary tool under real production conditions, wherein the rotary tool has an axial direction;
providing a tester, which during the test allows independent measurement of a force applied to the rotary tool in the axial direction and forces acting on the rotary tool in two mutually perpendicular directions, which are also perpendicular to the axial direction of the rotary tool, the axial direction coinciding with the Z-axis direction in an orthodox coordinate system X-Y-Z;
initiating the hole treatment operation on the tester under test conditions which allows to simulate the real production conditions and applying to the rotary tool a force acting in the Z-axis direction;
independently measuring the force acting in the Z-axis direction and the forces acting in the directions perpendicular to the Z-axis direction;
determining the test conditions that provide equality of forces acting in the directions perpendicular to the Z-axis direction by varying the test conditions;
repeating the test conditions n-times; and
selecting the test conditions most optimal for satisfying the given technical requirements.

2. The method according to claim 1, wherein the given technical requirements are selected from the group consisting of concentricity of the hole, ovality, eccentricity, coaxiality of the treated hole with the z-axis direction, surface roughness on the inner surface of the hole, and deviation from the ideal roundness of the hole.

3. The method according to claim 2, wherein the test conditions are selected from the group consisting of a value of a thrust force applied to the rotary tool in the direction of the Z axis, rotation speed of the rotary tool, torque applied to the rotary tool, and the amount of an axial feed applied to the tool.

4. A method of determining optimal operation conditions for treating holes with rotary tools on a hole treatment operation, the method comprising the steps of:
providing given technical specification requirements for a hole to be treated under real production conditions by a rotary tool having an axial direction;
providing a tester which allows, during the hole treatment operation, independent measurement of a first force applied to the rotary tool in the axial direction, a second force acting in a second direction, and a third force acting in a third direction, wherein the second direction and the third direction are perpendicular to each other and to the axial direction of the rotary tool and wherein axial direction coincides with a Z-axis direction in an orthodox coordinate system X-Y-Z, the tester having a frame;
providing the tester with a torque measurement unit, which consists of a three-layer package composed of a first sensor unit having first sensors for measuring the first force, the second sensor unit with second sensors for measuring forces acting in the second direction, and a third sensor unit with third sensors for measuring forces acting in the third direction, the second sensor unit and the third sensor unit being identical but turned by 90° relative to each other around the axial direction;

attaching the first sensor unit rigidly to the frame though the first sensors, attaching the third sensor unit to the first sensor unit rigidly relative to the Z-axis direction but resiliently with respect to the second direction and the third direction;

attaching the third sensor unit rigidly to the second sensor unit;

attaching the rotary tool to the third sensor unit resiliently in the Z-axis direction but rigidly with respect to the second direction and third direction;

initiating the hole treatment operation on the tester under test conditions which allows to simulate the real production conditions and applying to the rotary tool a force acting in the Z-axis direction;

independently measuring the force acting in the Z-axis direction and the forces acting in the directions perpendicular to the Z-axis direction;

determining test conditions that provide equality of forces acting in the directions perpendicular to the Z-axis direction by varying test conditions;

repeating the test conditions n-times; and selecting the test conditions most optimal for satisfying the given technical requirements.

5. The method according to claim 4, wherein the given technical requirements are selected from the group consisting of concentricity of the hole, ovality, eccentricity, coaxiality of the treated hole with the z-axis direction, surface roughness on the inner surface of the hole, and deviation from the ideal roundness of the hole.

6. The method according to claim 5, wherein the test conditions are selected from the group consisting of a value of a thrust force applied to the rotary tool in the direction of the Z axis, rotation speed of the rotary tool, torque applied to the rotary tool, and the amount of an axial feed applied to the tool.

7. The method of claim 6, further comprising the step of using equality of the forces acting in the second direction and the forces acting in the third direction as a criterion that satisfies the given technical requirements.

8. The method of claim 7, further comprising the step of making the second sensor unit in the form of a package of two identical flexible parallelograms, which are turned by 90° to each other, wherein each parallelogram comprises an upper sensor-holding plate and a lower-sensor holding plate which are interconnected via flexible beams which allow coplanar movement of the upper sensor-holding plate and a lower-sensor holding plate relative to each other in the second direction in one parallelogram and in the third direction in another parallelogram, the second sensors being attached to the flexible beams of the first parallelogram, and the third sensors being attached to the flexible beams of the second parallelogram.

9. The method of claim 6, further comprising the step of making the second sensor unit in the form of a package of two identical flexible parallelograms, which are turned by 90° to each other, wherein each parallelogram comprises an upper sensor-holding plate and a lower-sensor holding plate which are interconnected via flexible beams which allow coplanar movement of the upper sensor-holding plate and a lower-sensor holding plate relative to each other in the second direction in one parallelogram and in the third direction in another parallelogram, the second sensors being attached to the flexible beams of the first parallelogram, and the third sensors being attached to the flexible beams of the second parallelogram.

10. The method of claim 5, further comprising the step of using equality of the forces acting in the second direction and the forces acting in the third direction as a criterion that satisfies the given technical requirements.

11. The method of claim 10, further comprising the step of making the second sensor unit in the form of a package of two identical flexible parallelograms, which are turned by 90° to each other, wherein each parallelogram comprises an upper sensor-holding plate and a lower-sensor holding plate which are interconnected via flexible beams which allow coplanar movement of the upper sensor-holding plate and a lower-sensor holding plate relative to each other in the second direction in one parallelogram and in the third direction in another parallelogram, the second sensors being attached to the flexible beams of the first parallelogram, and the third sensors being attached to the flexible beams of the second parallelogram.

12. The method of claim 5, further comprising the step of making the second sensor unit in the form of a package of two identical flexible parallelograms, which are turned by 90° to each other, wherein each parallelogram comprises an upper sensor-holding plate and a lower-sensor holding plate which are interconnected via flexible beams which allow coplanar movement of the upper sensor-holding plate and a lower-sensor holding plate relative to each other in the second direction in one parallelogram and in the third direction in another parallelogram, the second sensors being attached to the flexible beams of the first parallelogram, and the third sensors being attached to the flexible beams of the second parallelogram.

13. The method of claim 4, further comprising the step of using equality of the forces acting in the second direction and the forces acting in the third direction as a criterion that satisfies the given technical requirements.

14. The method of claim 13, further comprising the step of making the second sensor unit in the form of a package of two identical flexible parallelograms, which are turned by 90° to each other, wherein each parallelogram comprises an upper sensor-holding plate and a lower-sensor holding plate which are interconnected via flexible beams which allow coplanar movement of the upper sensor-holding plate and a lower-sensor holding plate relative to each other in the second direction in one parallelogram and in the third direction in another parallelogram, the second sensors being attached to the flexible beams of the first parallelogram, and the third sensors being attached to the flexible beams of the second parallelogram.

15. The method of claim 4, further comprising the step of making the second sensor unit in the form of a package of two identical flexible parallelograms, which are turned by 90° to each other around the axial direction, wherein each parallelogram comprises an upper sensor-holding plate and a lower-sensor holding plate which are interconnected via flexible beams that allow coplanar movement of the upper sensor-holding plate and a lower-sensor holding plate relative to each other in the second direction in one parallelogram and in the third direction in another parallelogram, the second sensors being attached to the flexible beams of the first parallelogram, and the third sensors being attached to the flexible beams of the second parallelogram.

* * * * *